United States Patent Office 3,749,593
Patented July 31, 1973

3,749,593
LAMINATED MATERIALS AND METHOD OF PREPARATION
Le Roy H. Keiser, Downers Grove, Ill., assignor to Phillips Petroleum Company
No Drawing. Filed Sept. 24, 1971, Ser. No. 183,689
Int. Cl. B32b 7/06; B44d 1/14
U.S. Cl. 117—68                                       30 Claims

ABSTRACT OF THE DISCLOSURE

A laminate material is produced by coating a substrate with a first silicone release agent coating containing a curing catalyst, a curing accelerator and/or an adhesion promoter and subsequently overcoating said first silicone release coating with a second silicone release agent coating containing a curing catalyst but no cure accelerator or adhesion promoter. The laminates are particularly useful as release sheets.

---

This invention relates to laminate materials. More particularly, the invention relates to laminate materials suitable for use as release sheets.

Release sheets are widely used in a variety of commercial applications. For example, in food packaging it is desirable that the food articles not stick to the paper of the carton or other wrappings. Articles such as decals, labels, tape, and the like which employ a pressure-sensitive adhesive utilize a protective release sheet over the adhesive. When such a product is used, the release sheet is peeled off and discarded and the exposed pressure-sensitive tape pressed onto the surface where the decal or label, etc., is to be placed. A common variety of release paper is one wherein one side thereof (the release side) is coated with a polymeric siloxane material commonly referred to as silicones. It is also known to coat substrates such as paper with a thermoplastic material such as polyethylene and then overcoat the thermoplastic layer with an overcoating of a polymeric siloxane material. It is also known to coat both surfaces of a substrate with a thermoplastic material and then overcoat one or both sides of the coated substrate with an overcoating of a polymeric siloxane material.

Despite the widespread commercial use of release sheets, such materials are not without problems. One such problem is attainment of a good bond between the polymeric siloxane layer and the underlying substrate. Another such problem is blocking or the tendency of adjacent surfaces of stacks or rolls to adhere or transfer coating between each other. The former has been alleviated to a great degree by including in the silicone formulations cure accelerators and/or adhesion (adhesivity) promoters to not only increase the rate of cure but also improve the adhesion of the silicone coating to the substrate. Numerous solutions have been proposed to overcome the blocking problem including the use of slip sheets, special chemical formulations for the surface coatings or other special treatment of one or both of the exposed surfaces. While such methods have enjoyed some degree of success, they are quite often undesirable because, inter alia, they are more often than not uneconomical.

It has now been discovered that blocking of silicone-coated release sheets can be at least materially reduced with no sacrifice in the bonding of the silicone release composition to the underlying substrate by the expedient of applying to at least one surface of the substrate a first coating of a silicone release composition containing a curing catalyst and at least one cure accelerator and/or adhesivity promoter and subsequently applying over the first coating a second coating of a silicone release composition containing a curing catalyst but from which composition cure accelerators and/or adhesivity promoters are specifically excluded. Both surfaces of the substrate can be coated in the same manner, i.e., with the two-layer silicone release coatings of the invention, although a reduction in blocking is provided when one surface of the substrate is coated according to the invention and the opposite surface of the substrate is coated with an overcoating of a silicone release composition containing a curing catalyst and at least one cure accelerator and/or adhesivity promoter.

The present invention contemplates not only the method of treating release sheets to reduce blocking but also the laminate structure characterized by a reduced tendency to block when stacked or in roll form. Thus, according to the invention, there is provided a laminate material, adaptable for use as a release sheet, comprising a flexible substrate; a first cured release coating bonded to at least one exposed surface of said substrate, said first cured coating comprising a silicone release material, a curing catalyst for such release material and at least one cure accelerator and/or adhesivity promoter; and a second cured release coating bonded to said first coating, said second coating comprising a silicone release material and a curing catalyst for said release material, said second coating containing no cure accelerator and/or adhesivity promoter.

The invention further provides a process or method for preparing a laminate structure having a reduced tendency to block which comprises, in combination, the steps of:

Applying to one side of a flexible substrate a first release coating composition, said release coating composition comprising a silicone release material, a curing catalyst for such material and at least one cure accelerator and/or adhesivity promoter;

Passing said thus coated substrate through a drying zone to obtain an essentially dry and at least partially cured silicone coating;

Applying to the exposed surface of said first coating a second release coating composition, said second release coating composition comprising a silicone release material and a curing catalyst for such material, said second composition being characterized in that it contains no cure accelerator and/or adhesivity promoter;

Again passing said thus coated and overcoated substrate through a drying zone to obtain an essentially dry and at least partially cured silicone coating; and Aging said thus coated and overcoated substrate to complete curing of said silicone coating and overcoating. If it is desired to coat a second surface of the substrate with a silicone material, the method of the invention includes the appropriate coating and intermediate cure steps necessary to provide the desired one-coat or two-coat silicone layers.

Any suitable substrate to which a silicone release composition can be bonded can be employed in the practice of this invention. Examples of suitable substrate materials include, among others, paper, plastic films such as polyethylene films, polypropylene films, etc., textile fabrics made from materials such as nylon, Orlon, rayon, glass fabrics, etc. Flexible substrates are presently preferred; however, it is within the scope of the invention to employ substrate materials which are nonflexible or substantially nonflexible, such as aluminum foil and the like.

Particularly preferred as a substrate material in the practice of the invention is paper because of the wide variety of applications in which it can be employed. Any type of paper having sufficient tensile strength to be handled in conventional paper coating and treating apparatus can be employed as the substrate layer. Thus, without attempting to limit the type of paper that can be used, presently contemplated is paper, paperboard and the like from straw, bark, wood, cotton, flax, corn stalks, sugar cane bagasse, bamboo, hemp and similar cellulose materials prepared by such processes as the soda, sulfite or sulfate (Kraft) processes, the neutral sulfite cooking process, alkali-chlorine processes, nitric acid processes, semichemical processes and the like. Any of the treated, filled, sized or resin-impregnated papers and the like can be employed. Although paper of any weight can be employed as a substrate material, paper having weights in the range of 25 pounds to 150 pounds per ream are presently preferred.

Also included as substrates within the meaning of the term as herein used are those base materials hereinbefore set forth which have been overcoated on one or both sides with a thermoplastic film forming material. Any of the thermoplastic materials known in the art which can be bonded to a substrate such as those described, supra, and to which a silicone release material can be bonded are suitable for use in the practice of the invention. Polymers and copolymers of monolefins having from 2–12, preferably 2–8, carbon atoms are preferred thermoplastic materials, with polyethylene and polypropylene being especially desirable materials.

The silicone release coating compositions which are suitable for use in the practice of this invention include any of the formulations known in the art. Generally, such compositions comprise at least one polyorganosiloxane and at least one catalyst or curing agent for such polyorganosiloxane(s). Such compositions are modified according to this invention in that the composition with which the substrate is first coated contains at least one cure accelerator and/or adhesivity promoter. As is known in the art, some materials have the capability of performing both functions, i.e., the capability of acting as a cure accelerator to increase the rate, reduce the curing temperature, etc., and also as an adhesivity promoter to improve bonding of the silicone composition to the substrate. The use of such dual function additives where appropriate is within the purview of the invention. An essential feature of the invention is the use of a second release coating composition comprising at least one polyorganosiloxane and at least one curing catalyst for such polyorganosiloxane(s) but which does not contain cure accelerators and/or adhesivity promoters. The polyorganoxiloxane materials selected for use in the coatings of the invention to coat either or both sides can be the same or different, it being well known that, by proper selection of the silicone materials, one can modify the release characteristics of the resulting laminate to obtain a desired degree of release and to build into the laminates characteristics such as differential release and other controlled release capabilities.

A wide variety of polyorganosiloxanes (commonly called silicones) can be used in the practice of the invention. Such polyorganosiloxanes are also sometimes referred to as polymeric silicone resins, rubbers, oils or fluids. These compositions are well known and fully described in the literature. These compositions are comprised essentially of silicon atoms connected to each other by oxygen atoms through silicon-oxygen linkages, e.g., —Si—O—Si—

The compositions used in the practice of the invention are preferably, but not necessarily, high molecular weight polymers and copolymers having molecular weights in the range of 5,000 to 250,000. They should not have obtained such a degree of polymerization or condensation that they are no longer soluble in common hydrocarbon solvents such as xylene, toluene, methyl ethyl ketone, and carbon tetrachloride. In general, any organic solvent having a boiling point equal to or less than that of xylene can be used in the compositions used in the practice of the invention. The solvent merely serves as a convenient vehicle or carrier for uniform application to the substrate. Thus, higher boiling solvents can be used but require so much time for their control that their use is not commercially economical. Various polyorganosiloxanes are commercially available in organic solvents, in various percent solids concentration. Exemplary of the silicone (polyorganosiloxane) materials which can be used in forming the silicone release coatings of the invention are those disclosed in U.S. Pats. 2,258,218; 2,258,220; 2,258,222; 2,494,920; 3,432,333; and 3,518,325.

Suitable catalysts which can be employed in the curing of the polyorganosiloxane release compositions of the invention include dibutyl tin di-ethylhexanoate, dihexyl tin di-2-ethyl hexanoate, ethyl tin trihexanoate, dibutyl tin dilaurate, octadecyl tin dilaurate, dibutyl tin diacetate, tributyl tin acetate, dibutyl tin succinate, various lead salts such as lead naphthenate and lead octoate, zinc octoate, zinc stearate, iron octotate, various organic peroxides such as benzoyl peroxide and 2,4-dichlorobenzoyl peroxide, and others well known in the art as curing agents or catalysts for polyorganosiloxane (silicone) materials. Presently preferred catalysts include the carboxylic acid salts of organotin compounds containing at least one carbon-tin bond such as those previously mentioned and mercapto salts of the formula $X_2Sn(SCH_2OOX^1)_2$, wherein X and $X^1$ are alkyl radicals of 1 to 20 carbon atoms such as methyl, ethyl, isopropyl, butyl, hexyl, octyl, dodecyl, octadecyl and eicosyl. Amines and amines derivatives such as diethylene triamine, triethylene tetramine and ethanol amine, as well as amine percursors such as the isocyanate compounds and amine-functional silanes such as gamma-aminopropyl triethoxy silane can also be used as curing catalysts for the first silicone coating bonded directly to the substrate. The amine salts of carboxylic acids can also be used as curing agents in the silicon release coatings of the invention. However, the amine-containing compounds are subject to the *caveat* that they cannot be used as cure catalysts in the second or exterior coatings of the invention since they also function as cure accelerators and/or adhesivity promoters and, in accordance with the invention, must be excluded from the second or exterior coating. In other words, it is essential that at least one surface of the substrate have an exterior silicone release coating composition which contains no cure accelerator and/or adhesivity promoter incorporated therein.

The cure accelerators and/or adhesivity promoters which can be used in the first silicone release coating, i.e., the release coat of the invention which is bonded to at least one surface of the substrate in accordance with the invention, are also well known in the art. Exemplary of such cure accelerators and/or adhesivity promoters are amines, amine-functional silanes and amine precursors previously discussed as well as other silane derivatives such as acetoxy-functional silanes of the type vinyl $$Si(OOCCH_3)_3$$

and orthosilicates such as tetra(diethylene glycol monomethyl ether) silane. Orthosilicates which have been found to be advantageous include ethylene glycol derivatives having the formula $Si[(OC_2H_4)_2OR]_4$, wherein R is alkyl or alkenyl radical having up to 8 carbon atoms, e.g., methyl, ethyl, isopropyl, butyl, octyl, vinyl, allyl, etc. and $Si(OC_2H_4OR^1)_4$ wherein $R^1$ is an alkyl or alkenyl radical having up to 8 carbon atoms, e.g., methyl, propyl, butyl, pentyl, hexyl, allyl, pentenyl, etc. Isocyanate compounds which have been found to be effective in the practice of the invention include any isocyanate which is soluble in organic solvents and which has an average of at least two isocyanate groups per molecule. Such isocyanates can be monomeric or polymeric in nature, e.g., the isocyanate can be a partially hydrolyzed toluene diisocyanate. In other words, an urea or polyurea which still retains isocyanate groups in the molecules or a polybiuret containing unreacted isocyanate groups are typical of the isocyanate compound which can be used in the practice of the invention. Other such isocyanates include the reaction products of an isocyanate with a polyhydroxyl compound (i.e. a polyurethane or allophanates derived therefrom), the reaction product of an isocyanate and a polyamine which reaction products contain unreacted isocyanate groups. In addition the isocyanate can be a polymeric material in which the polymerization is effected by mechanisms not involving the isocyanate group.

Representative examples of such isocyanate compounds include tris(p-isocyanatophenyl)methane;
naphthalene diisocyanate-1,5;
3,3'-bitolylene-4,4'-diisocyanate;
diphenylmethane-4,4'-diisocyanate;
4,4'-biphenylene diisocyanate;
3,3'-dichloro-4,4'-biphenylene diisocyanate;
2-nitrodiphenylene-4,4'-diisocyanate;
diphenylsulfone-4,4'-diisocyanate;
fluorine diisocyanate; and
octamethylenediisocyanate.

At least some of these compounds also function as curing catalysts per se as well as cure accelerators and/or adhesivity promoters. While such materials can be employed in the first silicone release coating of the invention to take advantage of this plural function, they cannot be used as curing catalysts in the second or overcoating (exterior) release composition since at least one of the substrate surfaces must have two silicone release coatings, the exterior of which silicone release coatings on such surface must not contain cure accelerators and/or adhesivity promoters.

The amount of curing agent or catalyst, cure accelerator and/or adhesivity promoter employed in the silicone release coatings of the invention can be varied widely depending upon the curing temperature, the particular catalyst used, the particular polyorganosilixane materials selected, the particular cure accelerator and/or adhesivity promoter used, the substrate, desired curing time, etc. Usually the amount of any of such components will be in the range of 0.5 to 20 weight percent of the silicone material employed.

The silicone materials employed in the coating compositions can be the same or different and include mixtures of two or more polyorganosiloxanes. If desired, the silicone release material, particularly in the exterior coating, if any, can include a filler material to impart an improved differential release value to the laminate.

Depending upon the type of substrate and the properties desired in the final product, it may or may not be desirable to prime or activate the surfaces of the substrate prior to application of the release coating.

The above-described composite release subsurfaces of the invention can be prepared in any manner known to the art for applying coating materials to substrates. All of the priming, coating, and activating operations described herein can be carried out "in line," i.e., continuously, employing conventional equipment. The coating materials described herein can be conveniently applied using rotogravure rolls but any other coating technique employing any other type of roll coater, knife coater, or other coating device which is capable of applying a coating of the coating material in the desired amount can be employed.

However, for best results and in accordance with the invention it is preferred that the various operations or steps carried out in fabricating the composite release sheets of the invention be carried out in a particular manner and sequence as set forth below. For convenience, these operations or steps are described in terms of employing paper as the substrate. However, as indicated above, it will be understood that the invention is not limited to employing paper as a substrate.

If desired, one or both exposed surfaces of the substrate can be coated with a thermoplastic film forming material such as a polyolefin before applying the polyorganosiloxane coating or coatings to either or both sides of the substrate. When both surfaces of the substrate are so coated, one should allow at least twenty-four hours between the application of the polyolefin coatings to the opposite sides of the substrate so as to provide time for the moisture in the paper to dissipate evenly therethrough before the paper is subsequently heated in curing the polyorganosiloxane overcoats. Uneven distribution of moisture in the paper can lead to bubble or blister formation in the polyolefin coatings when the subsequently applied polyorganosiloxane overcoats are cured. The heating step can be carried out in one stage in a conventional manner. However, superior results are obtained when said heating is carried out in two successive stages. At least two things occur in the heating step which is applied to the polyorganosiloxane coatings. One, the solvent contained in the coating material is evaporated. Two, curing of the polyorganosiloxane coating material is initiated and at least partially completed. Said curing is accomplished by a crosslinking, condensation, and/or polymerization to give a hard, dry surface. It is essential that said heating of the polyorganosiloxane overcoating material be accomplished without distorting the polyolefin coating thereunder.

Curing of said polyorganosilioxane coating material can take place at room temperature depending upon the particular silicone material used and the particular curing agent or catalyst used in conjunction with said silicone material. However, for practical continuous operations the time required for curing at room temperature is too long. Most curing agents or catalysts are capable of promoting relatively rapid curing at moderately elevated temperatures. This temperature at which relatively rapid curing takes place is sometimes referred to as the curing initiating temperature even though curing will take place at room temperature. For the preferred polyorganosiloxanes described herein this temperature is in the range of 160 to 650° F. Once curing has been initiated and maintained at an elevated temperature for a short period of time as described herein, the curing can then advantageously be allowed to proceed by aging at reduced temperatures, e.g., at room temperatures or moderately (25 to 50° F.) above. As mentioned above, it is essential that said curing be effected without distorting the polyolefin coating under the polyorganosiloxane overcoating. Thus, the choice of temperature actually employed in the curing steps will depend upon a number of factors such as the type of polyolefin coating material used, the type of silicone overcoating material used, the curing catalyst used with said silicone material, and the rate at which the coated paper is passed through the heating zone. For example, polypropylene has a higher melting point than polyethylene; the temperature at which the silicone material cures is effected by the choice of curing catalyst; and the oven temperatures will vary with the rate at which the paper is passed therethrough.

Ideally, it is desirable in said heating and curing steps to heat the silicone overcoating material and not heat the polyolefin coating material thereunder. However, as a practical matter, this is practically impossible to accomplish. In any event, it is desired to heat and cure the polyorganosiloxane overcoating material as rapidly as possible without heating the polyolefin coating thereunder sufficiently to cause distortion of said polyolefin coating. Thus, in the practice of the invention, it is preferred to increase the temperature of the silicone overcoated material the desired amount as rapidly as possible and then hold it as the increased temperature for a period of time sufficient to effect the desired amount of partial curing. Thus, in a preferred manner of practicing the invention, the coated and overcoated paper substrate is passed through a first and a second heating zone, in series.

Prior to coating the paper substrate with a silicone release coating or a polyolefin, it is desirable, but not essential, to prime the surface of the paper to improve the bond between the substrate and the silicone release coating or polyolefin. Any suitable priming material or method can be employed to accomplish this. Thus, the invention is not limited to any particular priming material or method.

Solutions of polyalkylene imines are one presently preferred priming material. These materials have the general formula

$$H+R-NH-R-NH)_nNH_2$$

wherein R is an alkylene group containing from 2 to 4 carbon atoms and $n$ is an integer of from 1 to 2,000, or higher. Polyalkylene imines utilized for treating the surface of the paper substrate may be of any desired molecular weight in which the material can be obtained. Generally speaking, however, it is advantageous to avoid the use of very low molecular weight materials having excessive volatilities. In most instances, but not limited thereto, it is preferred to employ the relatively low molecular weight polymers which are water soluble. However, it is within the scope of the invention to employ the higher molecular weight materials in solution or dispersed in a suitable solvent such as acetone, methyl ethyl ketone, and the lower alkyl alcohols containing less than 4 carbon atoms. Polyethylene imine is a presently most preferred priming agent. Aqueous solutions of polyethylene imine in water and consisting essentially of about 10 weight percent polyethylene imine are available. Generally, such solutions are diluted with more water to a polyethylene imine concentration of 0.5 to 2 weight percent prior to use. If desired, a small amount of a wetting agent such as sodium hexametaphosphate can be added. Generally speaking such liquid priming agents are applied to the paper in an amount within the range of from 1 to about 2.5 pounds per ream, on a wet basis.

If desired, the surface of the paper can be primed utilizing physical treatments instead of the above-described chemical treatment. For example, a flame treatment such as that disclosed in U.S. Pats. 2,632,921; 2,683,894; or 2,746,084 can be employed. Or, one of the many forms of glow discharge, corona discharge, electrical bombardment, or otherwise termed electrical treatments such as those described in U.S. Pats. 2,910,723; 3,018,180; or 2,935,418 can be used. Thus, the term "prime" or "priming" when employed in connection with treating the surface of the paper substrate, as used herein and in the claims, unless otherwise specified, includes either a chemical treatment or a physical treatment as described above.

The polyolefin can be extrusion coated onto the paper at extrusion temperature within the range of from 500 to 700° F., preferably 550 to 650° F., using any standard extrusion process known to the art. The process is conveniently carried out "in line," i.e., continuously. The amount of polyolefin coating applied to the paper substrate will usually be within the range of from 3 to 30, preferably from 7 to 15, pounds per ream. The same or different amounts of said polyolefin coating can be applied to the opposite sides of the paper substrate.

The term "polyolefin" as used herein, unless otherwise specified, refers to the normally solid polymers of 1-olefin hydrocarbons. As employed herein unless otherwise specified, the terms "polymer" or "polymers" include homopolymers of said 1-olefins having 2 to 12 carbons atoms, copolymers of one of said 1-olefins with another of said 1-olefins as a comonomer; and blends of at least one of said copolymers with normally solid polyisobutylene. The polymers 1-olefins having from 2 to 4 carbon atoms per molecule are usually preferred. Examples of said homopolymers include polyethylene, polypropylene, poly-1-butene, and the like. An example of a copolymer within the above definition is a copolymer of ethylene with 1-butene having from 1 to 10, preferably 1 to 5, more preferably 1 to 3, weight percent of the 1-butene comonomer incorporated into the copolymer molecule. Examples of blends of said copolymers with polyisobutylene are those blends containing up to 35 weight percent, preferably from 1 to 35 weight percent of said polyisobutylene and from 99 to 65 weight percent of a copolymer of ethylene with one of said comonomers, e.g., 1-butene. Polyethylene and polypropylene are presently preferred coating materials. Generally speaking, the low density (about 0.91 g./cc.), high melt index (about 12), and the visbroken high density (about 0.95–0.96 g./cc.) polyethylenes are presently more preferred. Methods for preparing the above-described polymers are well known to those skilled in the art. If desired, the polyolefin coating may be activated prior to applying the polyorganosiloxane overcoating material thereto to improve the bond. A variety of methods are known in the prior art for accomplishing this. As used herein and in the claims, unless otherwise specified, the terms "active," "activated," and "activation," when employed in connection with or describing a polyolefin surface, are intended to refer to a surface which has been pretreated by a process such as flame oxidation; chemical oxidation; treatment with a variety of agents such as ozone, chlorine, and various acids, various forms of electrical bombardment or discharge treatments, etc. For example, a flame treatment such as that disclosed in U.S. Pats. 2,632,921; 2,683,894; or 2,746,084 can be used. Or, a solution such as that disclosed in U.S. Pat. 2,668,134 can be used. Or, preferably, one of the many forms of glow discharge, corona discharge, electrical bombardment, or otherwise termed electrical treatments such as those disclosed in U.S. Pats. 2,910,723; 3,018,189; or 2,935,418 can be used, The apparatus and method for discharge treatment disclosed in said Pat. 3,018,189 are a presently preferred way of pretreating or activating the polyolefin surface.

As used herein, unless otherwise specified, the term "ream" refers to a ream containing 3,000 square feet.

Illustrative of laminate structures particularly suitable for use as release sheets which can be prepared according to the invention include:

A laminate structure comprising a flexible substrate; a first cured silicone release coating composition bonded to one surface of said substrate, said first composition having incorporated therein at least one polyorganosiloxane, a curing catalyst and at least one cure accelerator and/or adhesivity promoter; and a second cured silicone release coating composition bonded to said first coating composition, said second composition comprising at least one polyorganosiloxane and a curing catalyst and being characterized in that said second composition does not contain any cure accelerator and/or adhesivity promoter. Optionally, the reverse surface of the substrate can be overcoated in a like manner.

The laminate structure, if desired, further comprises a coating of a thermoplastic film forming material bonded to one surface of the substrate, a first cured silicone release composition as hereinbefore described bonded to said thermoplastic film and a second cured silicone release coating composition as hereinbefore described bonded to said first release coating composition. Optionally, the laminate further comprises a coating of a thermoplastic film forming material bonded to the opposite or reverse surface of the substrate, which may itself be overcoated with a print-receptive surface. If desired, the thermoplastic film forming material on the reverse surface can also be overcoated in accordance with the invention.

As a more specific example of the manufacture of laminate materials according to this invention, a solution of Syl-Off 23 silicone coating composition is prepared by diluting Syl-Off 23 with a suitable solvent, e.g., toluene, to a 5 percent solids content. Syl-Off 23 silicone coating composition is a commercially available solution of curable silicone rubber polymer in a solvent. To a first portion of the diluted coating solution is added as a curing agent or catalyst an effective amount of dibutyl tin di-2-ethylhexanoate in combination with an effective amount of an orthosilicate fast cure additive, e.g., tetra-(diethylene glycol monomethyl ether) silane, and an adhesivity promoter, e.g., an acyloxy functional silane such as vinyl acetoxysilane. This solution is applied to or coated on a 60 pound per ream semi-bleached super-calendered Kraft paper. The structure is passed through a drying oven at 400° F. to evaporate the solvent and at least partially cure the silicone coating. A second portion of the diluted coating solution, to which is added only the curing catalyst, i.e., the second portion contains no fast cure additive (cure accelerator) or adhesion promoter, is applied to or coated on the at least partially cured first silicone coating. The resulting structure is again passed through a drying oven maintained at 400° F. to evaporate the solvent and at least partially cure the silicone overcoating. The structure is then aged in the roll at room temperature for 48 hours to complete curing of the silicone coatings. The structure is tested for blocking by evaluating the continuity of the silicone surface by a conventional test procedure in which the surface of the laminate is flooded with a water-based dye solution. The continuity of the silicone surface of the laminate prepared according to the invention is determined to be disrupted to a lesser extent than the surfaces of a laminate which does not have the two-layer silicone coatings of the invention. The degree of continuity of the silicone surface is a measure of the blocking of laminate materials, i.e., the more continuous the surface the less will have been the blocking. Thus, the laminates of the invention are demonstrated to have a reduced tendency to block.

In a second embodiment, an 80 pound per ream semi-bleached super-calendered Kraft paper is coated with a two-layer silicone release coating following the procedure of the invention. After room temperature aging to complete the curing of the silicone coatings, the reverse surface of the substrate was coated with a diluted Syl-Off 23 silicone composition containing a curing catalyst, cure accelerator and adhesivity promoter. Following room temperature aging in roll form, the laminate was tested for surface continuity in accordance with the foregoing test procedure and found to have reduced blocking, i.e., a more continuous silicone surface, in comparison to laminates which do not have at least one substrate surface treated according to the invention.

I claim:

1. A composite laminate suitable for use as a release sheet comprising
    a substrate;
    a first coating bonded to an exposed surface of said substrate, said first coating comprising a first silicone release agent composition, said first composition comprising a silicone release material, a curing catalyst for said silicone release material and at least one material selected from the group consisting essentially of cure accelerators for said silicone release material, adhesivity promoters to improve bonding of said first silicone release composition to said substrate, and mixtures thereof; and
    a second coating bonded to the exposed surface of said first coating, said second coating comprising a second silicone release agent composition, said second composition comprising a silicone release material and a curing catalyst for said silicone release material, said second composition being characterized by the substantial absence of a cure accelerator for said silicone release material or adhesivity promoter.

2. A composite laminate according to claim 1 further comprising
    a third coating bonded to the opposite uncoated exposed surface of said substrate, said third coating comprising a third silicone release agent composition.

3. A composite laminate according to claim 2 wherein said third coating composition comprises a silicone release material and a curing catalyst for said silicone release material, said third composition being characterized by the substantial absence of a cure accelerator for said silicone release material or adhesivity promoter.

4. A composite laminate according to claim 2 wherein said third coating composition comprises a silicone release material, a curing catalyst for said silicone release material and at least one material selected from the group consisting essentially of a cure accelerator for said silicone release material, an adhesivity promoter to improve bonding of said silicone release material to said substrate and mixtures thereof.

5. A composite laminate according to claim 4 further comprising
    a fourth coating composition bonded to the exposed surface of said third coating, said fourth coating composition comprising a silicone release agent composition, said fourth composition comprising a silicone release material and a curing catalyst for said silicone release material, said fourth composition being characterized by the substantial absence of a cure accelerator for said silicone release material or adhesivity promoter.

6. A composite laminate according to claim 4 further comprising
    a fourth coating composition bonded to the exposed surface of said third coating, said fourth coating composition comprising a silicone release agent composition, said fourth composition comprising a silicone release material, a curing catalyst for said silicone release material, and at least one material selected from the group consisting essentially of cure accelerators for such silicone release material, adhesivity promoters to improve bonding of said silicone release coating to the underlying surface, and mixtures thereof.

7. A composite laminate according to claim 1 wherein said substrate comprises a paper substrate having bonded to one surface thereof a polyolefinic material.

8. A composite according to claim 1 wherein said substrate comprises paper having bonded to a first surface thereof a polyolefinic material and having bonded to a second opposite surface thereof a polyolefinic material.

9. A composite laminate according to claim 2 wherein said substrate comprises a paper substrate having bonded to one surface thereof a polyolefinic material.

10. A composite laminate according to claim 2 wherein said substrate comprises a paper substrate having bonded to a first surface thereof a polyolefinic material and having bonded to a second opposite surface thereof a polyolefinic material.

11. A composite laminate according to claim 3 wherein said substrate comprises a paper substrate having bonded to one surface thereof a polyolefinic material.

12. A composite laminate according to claim 3 wherein said substrate comprises a paper substrate having bonded to a first surface thereof a polyolefinic material and having bonded to a second opposite surface thereof a polyolefinic material.

13. A composite laminate according to claim 4 wherein said substrate comprises a paper substrate having bonded to one surface thereof a polyolefinic material.

14. A composite laminate according to claim 4 wherein said substrate comprises a paper substrate having bonded to a first surface thereof a polyolefinic material and having bonded to a second opposite surface thereof a polyolefinic material.

15. A composite laminate according to claim 5 wherein said substrate comprises a paper substrate having bonded to one surface thereof a polyolefinic material.

16. A composite laminate according to claim 5 wherein said substrate comprises a paper substrate having bonded to a first surface thereof a polyolefinic material and having bonded to a second opposite surface thereof a polyolefinic material.

17. A composite laminate according to claim 2 wherein at least one of said second and third silicone release agent compositions contains a filler material.

18. A composite laminate according to claim 3 wherein at least one of said second and third silicone release agent compositions contains a filler material.

19. A composite laminate according to claim 4 wherein at least one of said second and third silicone release agent compositions contains a filler material.

20. A composite laminate according to claim 5 wherein at least one of said second and third silicone release agent compositions contains a filler material.

21. A composite laminate according to claim 9 wherein at least one of said second and third silicone release agent compositions contains a filler material.

22. A composite laminate according to claim 10 wherein at least one of said second and third silicone release agent compositions contains a filler material.

23. A composite laminate according to claim 11 wherein at least one of said second and third silicone release agent compositions contains a filler material.

24. A composite laminate according to claim 12 wherein at least one of said second and third silicone release agent compositions contains a filler material.

25. A composite laminate according to claim 13 wherein at least one of said second and third silicone release agent compositions contains a filler material.

26. A composite laminate according to claim 14 wherein at least one of said second and third silicone release agent compositions contains a filler.

27. A composite laminate according to claim 15 wherein at least one of said second and fourth silicone release agent compositions contains a filler.

28. A composite laminate according to claim 16 wherein at least one of said second and fourth silicone release agent compositions contains a filler.

29. A composite laminate according to claim 1 wherein said substrate is paper, plastic film, textile fabric or aluminum foil.

30. A method of making a composite laminate comprising
applying to a substrate a first coating of a silicone release agent composition comprising silicone release material, curing catalyst for said silicone release material and at least one material selected from the
group consisting esesntially of cure accelerators for said silicone release material, adhesivity promoters to improve bonding of said silicone release agent composition to said substrate, and mixtures thereof;
curing said first coating to effect at least a partial cure thereof;
applying to said first coating a second coating of a silicone release agent composition comprising silicone release material and curing catalyst for said silicone release material, said second coating being characterized by the substantial absence of cure accelerators for said silicone release material and adhesivity promoters;
curing said second coating to effect at least a partial cure thereof; and
aging the coated and overcoated substrate to complete curing of said first and second coatings.

References Cited

UNITED STATES PATENTS

| | | | |
|---|---|---|---|
| 3,503,782 | 3/1970 | Ayres | 117—45 |
| 3,628,996 | 12/1971 | Weber | 117—76 P |
| 3,419,508 | 12/1968 | Grenoble | 117—76 P X |
| 3,403,045 | 9/1968 | Erickson et al. | 117—76 P X |
| 3,432,333 | 3/1969 | Hurst | 117—68.5 X |

RALPH HUSACK, Primary Examiner

U.S. Cl. X.R.

117—47 A, R, 75, 76 F, P, T; 156—289; 161—406